US009509529B1

(12) United States Patent
McAllister et al.

(10) Patent No.: US 9,509,529 B1
(45) Date of Patent: Nov. 29, 2016

(54) ASSURED MESSAGING SYSTEM WITH DIFFERENTIATED REAL TIME TRAFFIC

(71) Applicant: Solace Systems, Inc., Ottawa (CA)

(72) Inventors: Shawn McAllister, Manotick (CA); Paul Kondrat, Ottawa (CA)

(73) Assignee: Solace Systems, Inc., Ottawa, ON (CA)

( * ) Notice: Subject to any disclaimer, the term of this patent is extended or adjusted under 35 U.S.C. 154(b) by 1022 days.

(21) Appl. No.: 13/652,779

(22) Filed: Oct. 16, 2012

(51) Int. Cl.
H04L 12/58 (2006.01)
G06F 15/16 (2006.01)

(52) U.S. Cl.
CPC ............... *H04L 12/581* (2013.01)

(58) Field of Classification Search
CPC .............. G06F 9/54–9/549; G06F 2209/457; G06F 2209/547; H04L 67/00–67/42; H04L 12/581–12/582; H04L 12/5855; H04L 12/5875
See application file for complete search history.

(56) References Cited

U.S. PATENT DOCUMENTS

| | | | | |
|---|---|---|---|---|
| 6,256,676 B1* | 7/2001 | Taylor | ................... | G06Q 10/06 709/246 |
| 6,728,270 B1* | 4/2004 | Meggers | ............. | H04L 12/5695 370/252 |
| 7,716,525 B1 | 5/2010 | Buchko et al. | | |
| 7,747,730 B1* | 6/2010 | Harlow | ............... | H04L 12/2697 709/202 |
| 7,859,992 B2 | 12/2010 | Buchko et al. | | |
| 7,926,099 B1* | 4/2011 | Chakravarty | ........... | G06F 9/542 340/500 |
| 7,945,631 B2* | 5/2011 | Chkodrov | ............... | H04L 12/58 709/206 |
| 8,082,554 B2* | 12/2011 | Craggs | .................... | G06F 9/542 719/313 |
| 8,144,714 B1 | 3/2012 | Buchko et al. | | |
| 8,214,847 B2* | 7/2012 | Chkodrov | .............. | G06Q 10/10 370/229 |
| 8,589,495 B1* | 11/2013 | Beckert | ................... | G06F 9/542 709/204 |
| 8,615,580 B2* | 12/2013 | Beardsmore | ............ | H04L 51/26 709/206 |
| 8,793,322 B2* | 7/2014 | Beardsmore | ............ | H04L 12/66 709/203 |
| 8,832,675 B1* | 9/2014 | Abderrazzaq | ....... | G06F 9/44505 717/169 |
| 8,843,580 B2* | 9/2014 | Beardsmore | ............ | H04L 51/14 709/203 |
| 9,189,305 B2* | 11/2015 | Campbell | ............... | G06F 9/546 |
| 2002/0152257 A1* | 10/2002 | Frolik | .................... | G06Q 30/06 709/201 |
| 2002/0178273 A1* | 11/2002 | Pardo-Castellote | .... | H04L 67/12 709/230 |
| 2003/0046395 A1* | 3/2003 | Fleming | .................. | G06F 9/542 709/226 |

(Continued)

OTHER PUBLICATIONS

Jacobsen, Hans-Arno, et al. "The PADRES Publish/Subscribe System." (2010): 164-205.*

(Continued)

*Primary Examiner* — David Lazaro
*Assistant Examiner* — Julian Chang
(74) *Attorney, Agent, or Firm* — Marks & Clerk; Richard J. Mitchell

(57) ABSTRACT

A method of managing shared resources for controlling message flows in an assured message delivery system having a plurality of clients involves identifying different classes of clients based on their performance behaviors, and providing differentiated access to said shared resources between said different classes of clients.

1 Claim, 4 Drawing Sheets

(56) References Cited

U.S. PATENT DOCUMENTS

| | | | |
|---|---|---|---|
| 2003/0177179 A1* | 9/2003 | Jones | H04L 29/06 709/203 |
| 2003/0189915 A1* | 10/2003 | Miller | H04W 28/26 370/343 |
| 2004/0003064 A1* | 1/2004 | Astley | H04L 67/306 709/223 |
| 2005/0021622 A1* | 1/2005 | Cullen | G06Q 30/02 709/204 |
| 2005/0256931 A1* | 11/2005 | Follmeg | G06Q 10/10 709/206 |
| 2006/0047666 A1* | 3/2006 | Bedi | G06F 17/3089 |
| 2006/0069702 A1* | 3/2006 | Moeller | G06F 9/542 |
| 2006/0146991 A1* | 7/2006 | Thompson | G06F 9/542 379/67.1 |
| 2006/0149787 A1* | 7/2006 | Surlaker | G06F 9/546 |
| 2006/0167860 A1* | 7/2006 | Eliashberg | G06Q 30/06 |
| 2006/0233322 A1* | 10/2006 | Allman | H04L 29/06027 379/88.01 |
| 2006/0282524 A1* | 12/2006 | Lacombe | G06F 9/542 709/224 |
| 2007/0002750 A1* | 1/2007 | Sang | H04W 72/1236 370/238 |
| 2007/0083807 A1* | 4/2007 | Shaudys | G06F 17/30935 715/210 |
| 2007/0245018 A1* | 10/2007 | Bhola | G06F 21/6218 709/225 |
| 2008/0059552 A1* | 3/2008 | Blohm | H04L 67/24 709/200 |
| 2008/0133337 A1* | 6/2008 | Fletcher | G06Q 10/063 705/7.11 |
| 2009/0006599 A1* | 1/2009 | Brownrigg, Jr. | H04L 47/10 709/223 |
| 2009/0064182 A1* | 3/2009 | Holar | G06F 9/542 719/314 |
| 2009/0125420 A1* | 5/2009 | Zhang | G06Q 30/0601 705/26.1 |
| 2009/0313383 A1* | 12/2009 | Leung | H04L 12/1859 709/235 |
| 2010/0023974 A1* | 1/2010 | Shiragaki | H04N 21/2402 725/58 |
| 2010/0054193 A1* | 3/2010 | Gale | H04L 51/14 370/329 |
| 2010/0093441 A1* | 4/2010 | Rajaraman | H04L 67/2823 463/42 |
| 2010/0250684 A1* | 9/2010 | Naish | G06F 9/542 709/206 |
| 2010/0333111 A1* | 12/2010 | Kothamasu | H04L 12/5855 719/313 |
| 2011/0016123 A1* | 1/2011 | Pandey | G06F 17/30348 707/737 |
| 2011/0078233 A1* | 3/2011 | Salazar | H04L 12/581 709/203 |
| 2011/0099232 A1* | 4/2011 | Gupta | H04L 29/08729 709/206 |
| 2011/0126185 A1* | 5/2011 | Waris | H04L 12/588 717/169 |
| 2011/0320550 A1* | 12/2011 | Lawson | G06F 9/542 709/206 |
| 2012/0066290 A1* | 3/2012 | Amsterdam | H04L 67/148 709/203 |
| 2012/0158886 A1* | 6/2012 | O'Connell | H04L 67/22 709/217 |
| 2012/0272252 A1* | 10/2012 | Beardsmore | G06F 9/542 719/328 |
| 2013/0275612 A1* | 10/2013 | Voss | H04L 65/60 709/231 |
| 2014/0025763 A1* | 1/2014 | Furlong | H04L 12/585 709/206 |
| 2014/0067940 A1* | 3/2014 | Li | G06F 17/30 709/204 |
| 2014/0108642 A1* | 4/2014 | Cheriton | G06F 9/542 709/224 |
| 2014/0372591 A1* | 12/2014 | Payette | H04L 67/141 709/223 |
| 2015/0089026 A1* | 3/2015 | Payette | H04L 67/141 709/219 |

OTHER PUBLICATIONS

Pallickara, Shrideep, Hasan Bulut, and Geoffrey Fox. "Fault-tolerant reliable delivery of messages in distributed publish/subscribe systems." Autonomic Computing, 2007. ICAC'07. Fourth International Conference on. IEEE, 2007.*

Bhola, Sumeer, Yuanyuan Zhao, and Joshua Auerbach. "Scalably supporting durable subscriptions in a publish/subscribe system." null. IEEE, 2003.*

Sadoghi, Mohammad, Harsh Singh, and Hans-Arno Jacobsen. "Towards highly parallel event processing through reconfigurable hardware." Proceedings of the Seventh International Workshop on Data Management on New Hardware. ACM, 2011.*

Steyn, Manie C. "APIS: a real-time message-oriented middleware." (2001).*

* cited by examiner

ASSURED MESSAGING SYSTEM WITH DIFFERENTIATED REAL TIME TRAFFIC

FIELD OF THE INVENTION

This invention relates to data communication networks and in particular methods of providing differentiated treatment of real-time traffic in assured messaging systems.

BACKGROUND OF THE INVENTION

In the prior art, many message delivery systems exist which offer assured message delivery between endpoints, such as between different applications. Assured (sometimes also called guaranteed or persistent or durable) message delivery offers a "deliver at least once" delivery semantic, although other delivery semantics can also be offered, such as deliver at most once, deliver once and only once, etc. The messages are delivered to destination endpoints based on topics, queues, characteristics of the message content or a combination of criteria such as a topic to queue mapping; an exemplary system is described in U.S. Pat. No. 7,716,525 (Buchko), the contents of which are herein incorporated by reference. Such message delivery systems provide for loosely coupled message delivery between the message source and the receiving application (for one-to-one delivery) or receiving applications (for one-to-many delivery). When a message is sent a receiving application (or multiple receiving applications) may be offline or part of the network may be unavailable. The messaging system must persist (or store) the message so that it may deliver it to the receiving application when it comes back online or when a communications path to it is restored. As well, the system ensures message delivery to the receiving application(s) even in the presence of message loss between network elements, as may occur due to events such as communications errors, power outages, equipment failures, etc.

Of the assured message delivery systems known in the art; some are broker based where clients communicate via an intermediate system (or broker) and in other implementations the clients speak directly to each other with a replay system monitoring communication and performing the persistence functions. Similarly assured messaging systems may be assembled from standard components such as servers, disks, software libraries etc., or custom hardware assemblies such as network processors, FPGAs or a combination of standard and custom components. An example of a custom hardware platform for assured messaging is the Solace 3200 Series of middleware appliances from Solace Systems, Inc. There are undesirable behaviors exhibited by assured messaging systems that result from resource contention under specific traffic patterns where the behavior of one client can affect the latency and jitter and message rate experienced by another client. The desired behavior of the message delivery system is to protect resources needed to provide service to real-time message flows so that contention for resources from non-real-time message flows does not impede the ability of the system to provide the ideal service to the real-time message flows.

Broadly speaking there are four client behaviors seen in assured message delivery systems: publishing (or producing) client behavior, subscribing (or consuming) streaming client behavior, subscribing recovering client behavior and subscribing offline or slow client behavior. From the point of view of a publishing client the ideal assured message delivery system will accept messages from the publisher as fast as the publisher can produce them; put another way the message delivery system will not back-pressure publishers in order to not impede the overall performance of the publishing application. The message delivery system may backpressure publishers to prevent congestion but this is an undesirable behavior from the point of view of the publishing client. Streaming subscribers have no messages queued that cannot be immediately dispatched for delivery in the messaging system and are able and willing to receive more messages (known in the art as having an open receive window). When the message delivery router receives a message that matches a topic or queue endpoint for a streaming subscriber it is able to immediately forward a copy of the message to the subscriber. The ideal behavior of an assured message delivery system from the point of view of a streaming subscriber is to deliver messages to the subscriber with the lowest possible latency from the publisher to the subscriber. The recovering subscriber has undelivered messages queued for it on the messaging system and is able to receive messages. The undelivered messages queued on the message delivery router are often the result of a subscriber application going offline for some period of time (during which the message delivery router stored messages without immediately delivering them) and upon coming back online the subscribing application seeks to catch up on the messages that were queued during the time it was unavailable, plus additional arriving messages may be added to the queue(s) for the subscribing application during the recovery phase. The ideal behavior of the assured message delivery system with regard to recovering subscribers is to catch up (reduce the number of undelivered messages queued in the message delivery router to zero) as quickly as possible and transition to the streaming subscriber behavior. Offline or slow subscribers are unable or unwilling to receive new messages at the rate they are being published. In the offline or slow subscriber behavior the message delivery router is forced to queue messages without the ability to immediately deliver them to subscribers that are either offline or have a closed receive window. In the case of the offline or slow subscriber the ideal behavior of the assured message delivery system is simply to not lose messages and minimize the impact on the other classes of participants.

The assured message delivery system has a pool of finite resources that it must manage in order to provide ideal (or as close to ideal) service to the four classes of clients previously described. The resources available to an assured message delivery system are processing and memory cycles, internal interconnect bandwidth between system components, network bandwidth and access to non-volatile storage. How these resources are applied by the assured message delivery system to the task of delivering messages will affect how close to the idea level of service a particular client will receive. The level of service the overall system is providing can be measured in terms of the number of ingress messages per second, the number of egress messages per second, the distribution of latencies between the message arrival time from publishers to the delivery times to streaming subscribers, and the time taken for recovering subscribers to catch up with the queued message backlog and transition back to a streaming state. Current generation assured message delivery systems do not distinguish between the four client behaviors previously described and consequently are not able to efficiently allocate resources to service the four classes of clients differentially. An example of an undesirable behavior that results from this is when there are slow subscribers present in the system. It takes more resources to deliver a message to a slow subscriber than it does to a streaming subscriber because messages that are destined to slow subscribers must be retrieved from non-volatile storage (typically disk) for delivery, whereas messages for streaming subscribers (in most implementations) are written to disk or some other form of non-volatile storage but delivered from RAM. Retrieving a message from disk is a relatively expensive operation since accessing disk takes orders of magnitude more time than accessing RAM. The extra time and consumption of system resources spent delivering messages to slow subscribers can cause contention for system resources needed for other tasks such as processing new messages received from publishers and delivering those messages to streaming subscribers. If the assured message delivery system fails to process acknowledgements from streaming subscribers quickly enough then it may falsely think that the receive window to the streaming subscriber has closed and mistakenly transition that subscriber to a slow subscriber, affecting system throughput and behavior experienced by the (now slow) subscriber. If the assured message delivery system cannot process and acknowledge inbound messages from publishers quickly enough then the transmit windows for the publishers will close, back-pressuring the publishers and causing them to slow down which was previously identified as an undesirable behavior. If the assured message delivery system cannot deliver messages to streaming subscribers in a timely manner, latency-sensitive applications can see excessive and/or unpredictable message latencies and jitter and eventually reduced overall message delivery rate.

Current assured message delivery system implementations do not identify different client behaviors and process client messages differentially according to the client's behavior. A system that can identify these client behaviors and tailor its interactions with clients according to the ideal system behavior will exhibit better system performance. The messaging system, by dedicating resources to specific client flows, prioritizing certain work flows and bundling certain work flows, can make more efficient use of system resources, provide better overall service to clients and create better true real-time decoupling between the clients. The goal is to create a system that provides service as close to the previously described ideal behavior as possible for all clients regardless of the behavior of other clients. A system where the behavior of one client does not cause the level of service that another client receives to deviate from the ideal is desirable.

SUMMARY OF THE INVENTION

According to the present invention there is provided a computer-implemented method of managing shared resources for controlling message flows in an assured message delivery system having a plurality of clients, comprising identifying different classes of clients based on their performance behaviors; and providing differentiated access to said shared resources between said different classes of clients.

The system may conveniently separate tasks into real-time and non-real time processing tasks, with the real-time tasks being given preferential access to system resources. By separating the tasks in this way the use of system resources can be optimized to offer improved efficiency under a wide range of load conditions.

In accordance with another aspect, the invention provides an assured message delivery system for receiving incoming messages from publishing clients and delivering the incoming messages to subscribing clients with matching interests, and for receiving acknowledgement messages from the subscribing clients, comprising a processor configured to identify different classes of clients based on their performance behaviors; and said processor being configured to provide differentiated access to said shared resources between said different classes of clients.

In the context of schedulers the word preference means that a subscriber with a higher preference is ascribed a larger share of resources than subscribers with lower preferences. However, subscribers with a lower preference are not necessarily completely starved of resources; they are ascribed a smaller share of the resources than the higher preference subscribers. Preference has a more general meaning than priority, when used in the context of a priority scheduler, which implies that the scheduler allocates system resources in turn to subscribers on a priority basis.

In yet another aspect the invention provides a method of routing messages in an assured delivery system, comprising employing a first scheduler to initiate the following tasks: receive messages from publishing clients and placing the messages in a receive queue; match the received messages with the interests of subscriber clients; place the received messages matched to the interests of subscriber clients in subscriber clients queues; place the received messages in non-volatile storage and send an acknowledgement to the publishing clients, deliver messages to streaming subscriber clients; and employing a second scheduler to carry out tasks associated with non real-time subscriber clients; and wherein real-time processing tasks are given preferential access to system resources.

BRIEF DESCRIPTION OF THE DRAWINGS

The invention will now be described in more detail, by way of example, with reference to the accompanying drawings, in which:—

DETAILED DESCRIPTION OF THE PREFERRED EMBODIMENTS

Figure 1:
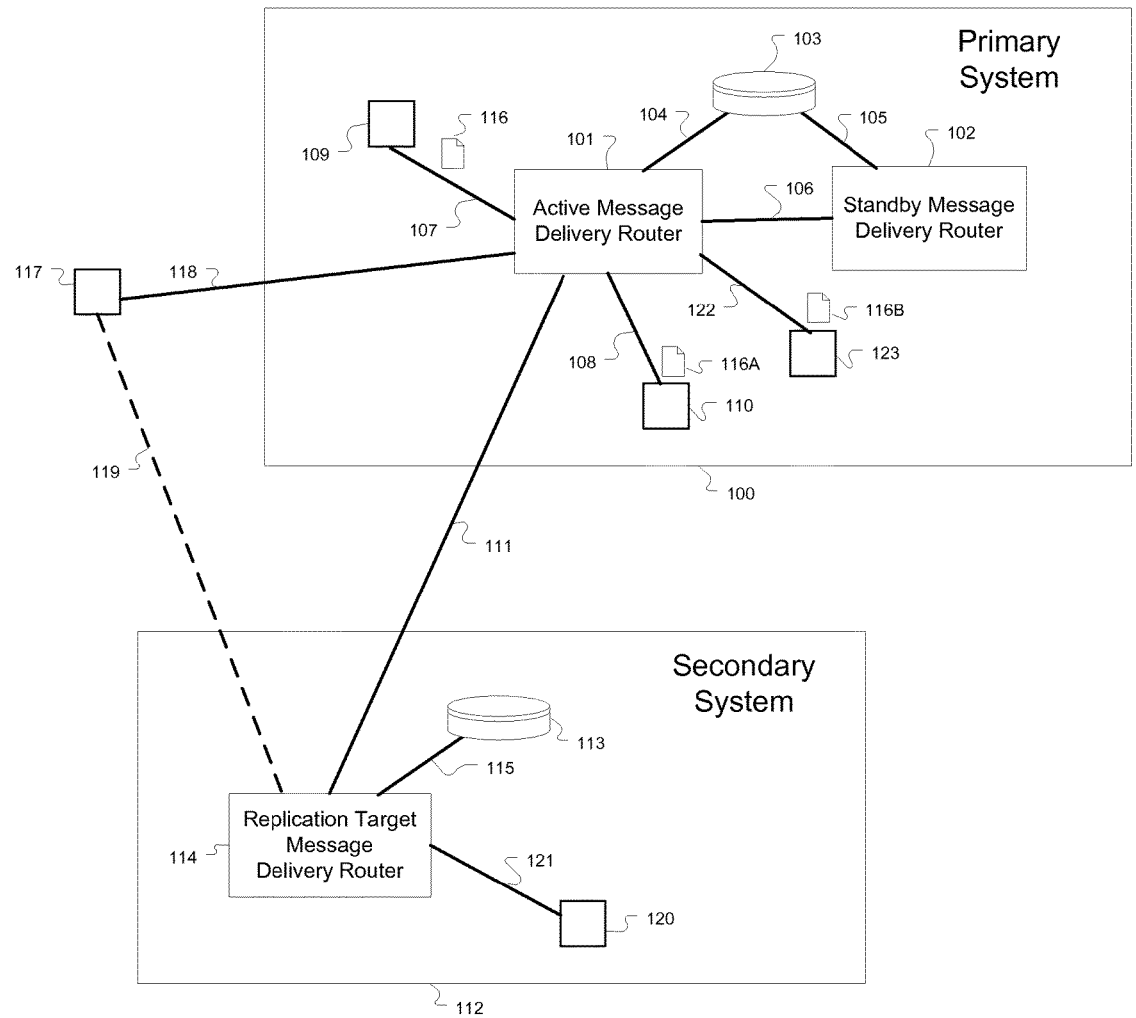
FIG. 1 shows an example message delivery network.

FIG. 1 shows a single node of a message delivery system 100, along with an optional secondary system 112. Many such nodes maybe combined as described by Buchko to create a larger message delivery network. The node depicted in FIG. 1 consists of two message delivery routers 101, 102 that form the primary system 100 and a replication target message delivery router 114 that is a part of a secondary system 112. A message delivery router 101, 102, 114 also known in the art as a message broker could be a networking appliance with specialized hardware components tailored to the task of delivering messages or a software application running on a general-purpose computer such as a server. The standby message delivery router 102 and the replication target message delivery router 114 are optional components in the present invention but, are included as most deployments of assured messaging systems require some level of site redundancy. Two message delivery routers 101, 102 that comprise the primary system 100 provide redundancy with automatic failover in the event that there is a component failure of the active message delivery router 101. The replication target message delivery router 114 of the secondary system 112 may be present as a backup to the primary system 100 to protect against a widespread failure of the primary infrastructure.

The message delivery routers 101, 102 that form a redundant pair are connected by an optional mate link 106 that can be used as a low latency method of exchanging state information as described by Buchko. The redundant message delivery routers 101, 102 also each have a connection 104, 105 to a shared storage 103. The links 104, 105 could be implemented using a standard storage area networking technology such as fiber channel, iSCSI, SAS or other. The shared storage 103 is typically implemented as an array of individual storage elements such as rotating magnetic hard drives or solid state drives (SSDs) and is available in the market place from multiple vendors. The shared storage 103 is used to store excess data that exceeds the capacity of local non-volatile storage of the message delivery router 101, 102 as described by Buchko. As previously noted the present invention does not require the presence of a standby router 102 and thus the mate link 106, the shared storage 103 and the links 104, 105 are all optional components. The existence of local non-volatile storage as described in Buchko is also an optional component of the present invention and is not required.

FIG. 1 also shows clients 109, 110, 123 of the messaging system. Client 109 is shown as a message publishing or producing client and clients 110, 123 are shown as message subscribing or consuming clients; however, any client 109, 110, 123 could produce, consume or produce and consume messages. The clients 109, 110, 123 are typically applications that are running on general-purpose servers or computers but could be any type of device that is capable of communicating with the message delivery router. Message 116 is shown as being created and sent to the active message delivery router 101 by client 109 for delivery to client(s) 110, 123 that have expressed interest in receiving messages (based on some criteria or interest previously communicated to the message delivery router 101) as described by Buchko. The clients 109, 110, 123 communicate with the message delivery router 101 via communication links 107, 108, 122 respectively. The communication links 107, 108, 122 as drawn are logical in nature, intended to be based on standard networking technology such as Ethernet, TCP/IP, infiniband or other. In a physical implementation of a system like that shown in FIG. 1 the communication links 107, 108, 122 would most likely be implemented using a series of network switches and routers typically present in a local area network. Not shown are additional logical communication links between the clients 109, 110, 123 and the standby message delivery router 102 that must also exist (if an optional standby message delivery router 102 is present) so that the clients 109, 110, 123 are able to communicate with the standby message delivery router 102 in the event of a failure of the active message delivery router 101. As an example, refer to U.S. Pat. No. 7,859,992 ("Router redundancy in data communication networks"), herein incorporated by reference.

A secondary datacenter hosts the optional replication target message delivery router 114 and related equipment such as storage 113, connected to message delivery router 114 via link 115. The storage 113 is an optional component, depending on implementation, as was described for the primary system 100. Client 120 connected to the replication target message delivery router 114 via link 121 is a standby application ready to become active in the event of an activity switch whereby the replication target message delivery router becomes active. An inter-datacenter link 111 provides a communication path between the active message delivery router 101 of the primary system 100 and the replication target message delivery router 114 of the secondary system 112. The inter-datacenter link 111 could be implemented using any standard networking technology but one suited to use in a wide area environment such as TCP/IP would be a logical choice. The inter-datacenter link 111 is a logical connection, in reality the two datacenters are typically connected by one or more switches, routers, transmission equipment, and physical links. The inter-datacenter link 111 is used to maintain the delivery state of messages 116 between the active message delivery router 101 of the primary system 100 and the replication target message delivery router 114 of the secondary system 112. Note that there are other means of providing data center redundancy for an assured messaging system, such as utilizing replication features of storage area networking (SAN) equipment. For example SAN equipment from EMC Corporation supports a feature called Symetrix Remote Data Facility (SRDF) and equipment from competing vendors have similar features, that replicate data stored to disk to a secondary disk system in a remote location. Software included as a part of a message delivery system can make use of such features to replicate state stored to a disk based file system to a secondary datacenter to be recovered in the event of a failure of the primary datacenter.

Client 117 in FIG. 1 is an example of a client that is not co-located with either the primary 100 or secondary 112 systems. The client 117 could be a server or computer hosted in a different datacenter, a mobile device or any device that is capable of communicating with the message delivery routers 101, 102, 114. Client 117 communicates with the message delivery routers 101, 102, 114 via communication links 118, 119; as with communication links 107, 108 and 122 these links are logical in nature and would most likely be comprised of a series of switches, routers, transport equipment and associated cables and optical fibers. Communication link 119 is shown as a dashed line indicating that it is not currently active. If there was an activity switch and the secondary datacenter 112 was to become active then client 117 would establish communication to with the replication target message delivery router 114 via communication link 119.

Figure 2:
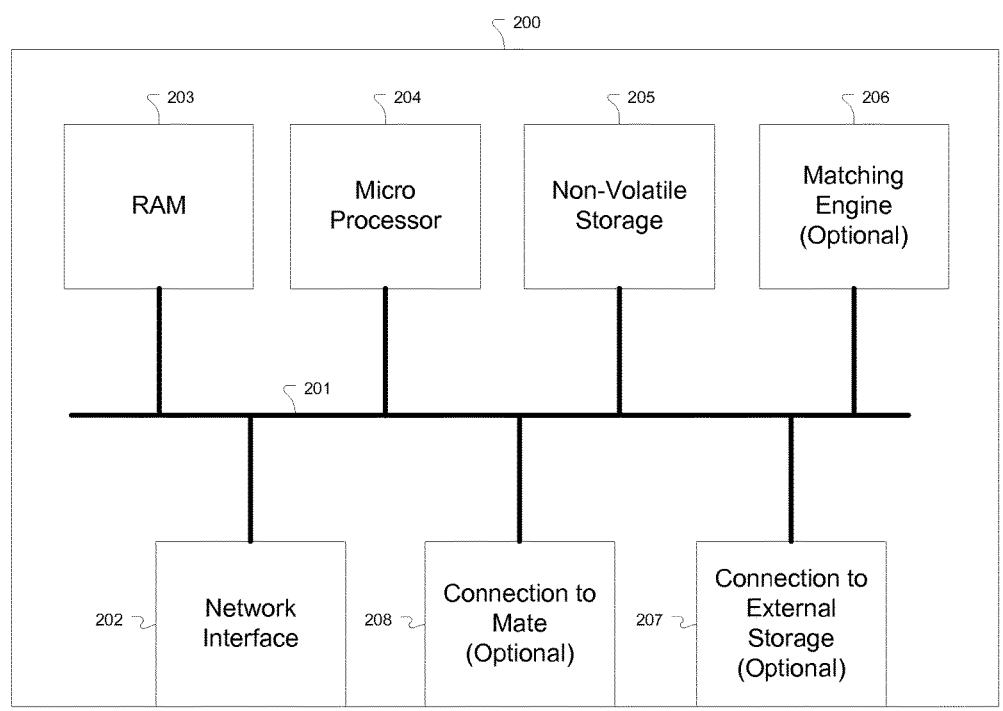
FIG. 2 shows a block diagram of an assured message delivery router.

FIG. 2 shows an example implementation of a message delivery router 200 capable of providing assured message delivery. Shown are the system resources that must be allocated to the various tasks that the message delivery router 200 must perform. The level of preference with which these resources are allocated to particular tasks will affect the system performance. In the example implementation there is a network interface 202, used by the message delivery router 200 to communicate with client systems 109, 110, 117, 123 of FIG. 1. The network interface 202 implements a standard networking protocol such as Ethernet or Infiniband; messages received from publishing clients or sent to subscribing clients must pass through the network interface 202. Any communication received from a client must traverse the system bus 201 and be placed in random access memory or RAM 203 as it is known in the art. The system bus 201 is a communication path inside the message delivery router 200 for which many protocols exist and are well known in the art. The system bus 201 could be implemented using PCI express or other protocol or a combination of different bus protocols connected by components known in the art as bridges and switches. Any communications to or from a client must exist in RAM 203 and is transferred to or from the network interface 202 by direct memory access or DMA as it is known in the art. Communication from clients such as messages from publishing clients once in RAM 203 can be inspected by a microprocessor 204.

The microprocessor 204 is shown as a single entity however, there may be multiple microprocessors present in the system, each of which may contain multiple processing cores. The microprocessor 204 is responsible for receiving all stimuli from clients and generating all responses; as such it is a key resource that must be managed in order to provide an assured messaging service with real-time behavior. Assured message delivery systems must be resilient to a variety of different failures such as a component failure, loss of power, system crash, network failure, client failure or other; messages received from publishing clients along with delivery status of destination clients must be stored in non-volatile storage 205 so that the system can recover from failure with no loss of information. Non-volatile storage 205 may be in the form of a disk, solid state disk (SSD), battery backed RAM, capacitor backed RAM, or a combination of RAM and other non-volatile storage as described by Buchko. Some prior art implementations of assured message delivery routers utilize a small but very fast (and more expensive) transitory non-volatile storage in combination with a much larger but slower (and less expensive) non-volatile storage; techniques for which are described by Buchko. In the case where a small transitory non-volatile storage 205 is used a larger non-volatile storage which may be a disk internal to the message delivery router 200 or an external storage device is required. External storage devices are accessible by standard storage area network (SAN) technologies such as fiber channel, iSCSI, FCoE, SAS, eSATA, infiniband or other. The connection to external storage 207 is a device that converts between the system bus 201 and the SAN, an example of such a device is known in the art as a host bus adaptor or HBA. Use of an external storage offers the advantage that it can be reachable from other systems, which may be used to facilitate system level redundancy.

The connection to mate 208 is an optional component that is used to communicate state information to a mate system for redundancy. In FIG. 1 the mate link joining the two redundant message delivery routers is shown as link 106. In some implementations of an assured message delivery router the connection to mate 208 may be combined with the non-volatile storage 205 as described by Buchko. The connection to mate 208 is used to transfer messages along with state information about the messages and the destinations for the messages. The connection to mate 208 could be a dedicated point-to-point link implemented using proprietary technology or it could be implemented using standard networking technology such as Ethernet, TCP/IP, Infiniband or other.

The optional matching engine 206 is a hardware engine designed to offload the microprocessor 204 of the task of matching published messages to subscriptions from subscribers. In many implementations the matching is performed by the microprocessor 204. Message delivery systems deliver messages received from publishing clients to subscribing clients that have indicated an interest in receiving messages that match a certain criteria. In many implementations the publishing clients add a meta-data topic to the message; this topic is compared by the message delivery router 200 to interests that it has collected from subscribing clients in a process called matching. For each message received from a publishing client the message delivery router 200 will deliver a copy of the message to each subscribing client that registered a matching interest (also known as a subscription). Alternately the message delivery router 200 could use aspects of the message content itself to match published messages to interests from subscribing clients. The process of matching can be an onerous task when there are large topic sets and large numbers of interests. In these situations the application of a hardware engine designed specifically to perform the task such as the matching engine 206 can enhance system performance. A publishing client may instead add a meta-data queue name or identifier to the message; this queue name or identifier is used to route the message to the correct named queue. The optional matching engine 206 can also be used to offload microprocessor 204 the task of determining the destination queue.

Figure 3:
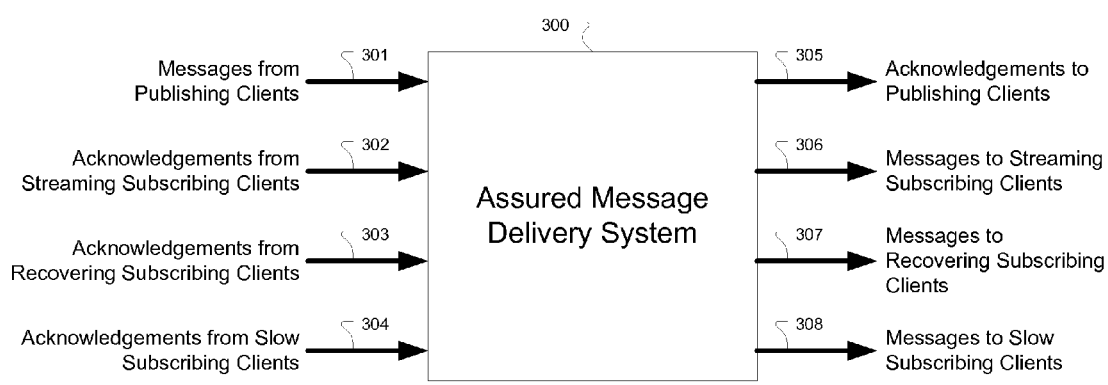
FIG. 3 shows the types of interactions that clients have with an assured message delivery router.

FIG. 3 shows a black box description of an assured message delivery system 300; it shows all of the types of client stimuli and the responses. The first type of stimulus that an assured message delivery system 300 could receive is a message received from a publishing client 301; the response to which is an acknowledgement to the publishing client 305 that the published message has been received and persisted to non-volatile storage 205. If a message from a publishing client 301 is matched by the assured message delivery system 300 to any interests from subscribing clients then a copy of the message or a reference to the message is placed in queue to each subscribing client that registered a matching interest. A copy or copies of a message that matched an interest of subscriber(s) in streaming mode are sent as response 306. A copy or copies of a message that matched an interest of subscriber(s) in recovering mode are sent as response 307. A copy or copies of a message that matched an interest of slow subscriber(s) are sent as response 308. The remaining stimulus events are acknowledgements of message receipt from subscribing clients shown as events 302-304. An acknowledgement of receipt received from a streaming subscribing client is shown as stimulus 302. An acknowledgement of receipt received from a recovering subscribing client is shown as stimulus 303. An acknowledgement of receipt received from a slow subscribing client is shown as stimulus 304.

Those skilled in the art will see that the stimuli and responses previously described are for what is known as a deliver at least once delivery semantic. Prior art message delivery systems may offer other message delivery semantics such as deliver once and only once that feature stimuli and responses in addition to those described in FIG. 3. The additional stimuli and responses are part of what is known in the art as a multi-way handshake protocol, an example of which is described in "MQ Telemetry Transport (MQTT) V3.1 Protocol Specification" by IBM, August 2010 the contents of which are herein included by reference. The techniques of the present invention may be applied to systems that feature such multi-way handshake protocols. In such a system the additional protocol messages from publishing client to message delivery router 300 such as a publish release message are given the same preference as published messages 301. Similarly additional protocol messages from subscribing client to message delivery router 300 such as a subscriber complete message should be given the same preference as a subscriber acknowledgement 302-304 from the same subscribing client.

In order to create an assured message delivery router that features real-time performance a method of classifying the clients must be developed so that decisions can be made as to how system resources should be allocated to processing specific types of events. It is relatively easy to identify publishing clients; these are any client that produces a message. Streaming subscribers are subscribing clients that are willing and able to receive and process new messages and that can keep up with the rate of messages being queued to them; the commonly used term to describe this is to say that they have an "open receive window". Slow subscribers are subscribers that are connected to the message delivery system but are not keeping up with the rate of messages being queued to them; they have a "closed receive window". Messages for slow subscribers will accumulate in the messaging system because they are incoming faster than the subscribing client is able to receive them. Offline subscribers are not currently connected to the message delivery system; the messaging system will queue (or store) messages until the subscriber reconnects. Offline subscribers are a special case of slow subscribers in that in both instances the subscriber will not accept a newly arriving message in a streaming fashion. Recovering subscribers are subscribers that were previously offline or slow and have messages stored in the messaging system, they have an open receive window and are eager to reduce the number of messages queued for them as quickly as possible, potentially accepting messages at a rate higher than the incoming rate of new messages queued to them.

The windowing concept previously mentioned is a reference to a class of protocol well known in the art as a windowing protocol. Many implementations and variants of windowing protocols exist. As it relates to a message delivery system a windowing protocol is used to provide back-pressure to a message sender (a message sender may be a publishing client or a message delivery router sending a message to a subscribing client) and also to aid in the detection of lost or re-ordered messages. In its simplest form a windowing protocol operates as follows. A sender has an initial window for a particular receiver. The window represents the maximum number of messages that the sender may send to the receiver without receiving an acknowledgement. For example if a sender has an initial window of ten for a particular receiver it may send ten messages to the receiver at which point it must pause until the receiver sends an acknowledgement of receipt for some or all of the messages. If for example the receiver returned an acknowledgement for the first five messages then the sender is free to send five more messages at which point it must again pause to wait for acknowledgements. If the receiver can send back acknowledgements faster than the sender can fill the window then the sender will never have to pause to wait for acknowledgements. If the sender has fewer messages outstanding than the size of the window then it is said that the window is open, if the sender has messages outstanding equal to or greater than the size of the window then it is said that the window is closed or that the receiver is back-pressuring the sender. A common variant of the windowing protocol is where the maximum window size is one message; the window of one variant of the protocol is often used by publishing clients (as in the Java Messaging Service API). In publishing applications where the maximum window size is one it is imperative that the message delivery router returns acknowledgements as quickly as possible because the publishing application cannot send another message until it receives the acknowledgement from the message delivery router. In the case of a maximum window size of one it is the latency from message sent to acknowledgement received that determines the maximum message rate that can be sent.

The present invention details methods of producing an assured messaging system that is capable of closely approximating the ideal behavior from the point of view of applications that wish to use it for real-time communications. The present invention also serves to optimize system performance (as measured by overall message throughput) even when applications do not require real-time communications; optimizing system throughput provides a more scalable and thus more cost-effective solution. Previously described were the different classes of clients that may be present in a message delivery system and the types of interactions that these clients have with the message delivery system. The following sections will detail the ideal behaviors of the messaging system from the point of view of these classes of clients.

From the point of view of a publishing client, the ideal message delivery system would allow it to publish messages as quickly as possible without asserting any form of back-pressure. In order to process a message from a publishing client and return an acknowledgement the assured message delivery router must perform the following processing steps with reference to FIG. 2. The publishing client generates a message and sends it to the message delivery router 200 over a network where it is received by the network interface 202. The message may be carried over a connectionless packet or a connection based protocol; the details of the underlying network protocols are not material to the present invention. The message must be placed in RAM 203 so that it can be processed by the micro processor(s) 204. The microprocessor 204 as previously described could be a general-purpose microprocessor, a network processor, a graphics processing unit (GPU), an ASIC, an FPGA, or a combination of microprocessor devices. Once the message has been placed in RAM 203 by the network interface 202 it can be examined by the microprocessor 204 and the topic or other information used to match the message to the interests of subscribing clients can be extracted. The topic of the message or extracted content can be optionally transferred to the matching engine 206 (if present) to determine which subscribing clients wish to receive a copy of the message. If the matching engine 206 is not present then the matching process can be completed by the microprocessor 204. Once the destinations for the message are determined then the message and list of destinations are stored in the non-volatile storage 205 or to external storage 103 via interface 207 if non-volatile storage 205 is not in use. Note that there may be other destinations for the message besides subscribing clients, for example the message may need to be sent to another message delivery router in the case that the message delivery system is comprised of a network of message delivery routers or a copy of the message may need to be sent to another message delivery router located in a remote datacenter for the purpose of disaster protection. U.S. Pat. No. 8,144,714, herein incorporated by reference, describes an exemplary method of providing assured message delivery across a distributed message delivery system with low delivery latency and network traffic. Our co-pending application of even date herewith entitled Replication in Assured Messaging System, herein incorporated by reference, provides an exemplary method of delivering assured messages to an assured delivery router located in a remote datacenter for the purpose of disaster protection. After placing the message in non-volatile storage a copy may also be transferred to standby message delivery router 102 that forms the other half of a redundant pair using the connection to mate 208 (shown as mate link 106 in FIG. 1). Once the standby message delivery router 102 has placed the message into non-volatile storage and acknowledged the receipt of the message the assured message delivery router 101 may send an acknowledgement of receipt back to the original publishing client via the network interface 202. In an alternative embodiment, once the message router has placed the message safely in shared external storage 103 it may send an acknowledgement of receipt back to the original publishing client.

If the message delivery router 200 is implemented using a transitory low latency storage element for non-volatile storage 205 using the techniques described by Buchko; then some management of the space in the non-volatile storage 205 will be required.

Messages that are stored in the non-volatile storage 205 that are expected to be long lived because they have destination subscribing clients that are offline, slow or are recovering and have many messages already in queue, must be moved to a larger backing store 103 in order to recover space in the non-volatile storage 205 to make room for new messages inbound from publishing clients. The larger backing store could be contained within the message delivery router or external, reachable via the connection to external storage 207.

From the point of view of a publishing client, the ideal behavior of the messaging system is to process published messages and return acknowledgements as quickly as possible so that the publishing client can send messages and is never back-pressured by the message delivery router 200. In order to provide this level of service the message delivery router 200 must separate the real-time critical steps from the processing previously described and perform these functions with priority. The real-time critical steps are anything that must be performed between the publishing client sending a message and the message delivery router 200 returning an acknowledgement. These steps are: receiving the message, looking up the destinations (or matching messages to interests from subscribing clients), storing the message in a non-volatile manner, such as in non-volatile storage 205, optionally storing a copy in a standby message delivery router 102, and sending an acknowledgement back to the publishing client. Non-real-time processing steps previously described are involved with managing the space in non-volatile storage 205 so that space will be available if a message is received from a publishing client. In order to provide an ideal service to publishing applications the real-time processing tasks must be separated from non-real-time processing tasks so that they can be performed with priority and/or run on dedicated processing elements. Additionally the non-real-time tasks must make sure that system resources are available when needed by the real-time tasks. For example the non-real-time task must manage the space in the transitory low latency storage 205 if using techniques described by Buchko so that space is available if a message is received from a publishing client.

The next real-time traffic flows are the streaming subscriber flows. Streaming subscriber flows are important for the following reasons, streaming subscribers want to receive messages with minimum latency from when the publishing client sent the message to when the subscribing client receives it and it takes less system resources to deliver a message to a streaming subscriber because it does not need to be read from non-volatile storage 205 or storage 103, which therefore allows a higher message delivery rate to be supported. The processing steps required to deliver a message to a streaming subscriber are as follows with reference to FIG. 2. The message and destinations exist in RAM 203 from previous processing performed when the message was received from the publishing client. Subscribers, in the list of destinations that have an open window are identified and copy of the message is transferred to each via the network interface 202. Upon receiving a copy of the message the subscribing client generates an acknowledgement of receipt and sends it back to the message delivery router 200. Once the message delivery router 200 has received an acknowledgement from each of the subscribing clients it may delete the message from RAM 203 and non-volatile storage 205. If there are any destinations for the message that are not streaming subscribers then using techniques described by Buchko the message may need to be moved from non-volatile storage 205 to mass storage either local or via external connection 207 to free up space in non-volatile storage 205 for new messages arriving from publishing clients. The housekeeping task of maintaining free space in non-volatile storage 205 can be performed with non-real-time priority so long as the system can recover space in non-volatile storage 205 at a rate that exceeds the rate of incoming messages from publishing clients. If a message is received from a publishing client and there is no free space in non-volatile storage 205 then the acknowledgement cannot be returned to the publishing client until space is recovered and the message is safely stored.

In the previously described processing steps real-time treatment should be given to the process of sending copies of the message to any streaming subscribers and processing acknowledgements from streaming subscribers. Resources applied to processing acknowledgements from streaming subscribers should be balanced with resources applied to delivering messages to streaming subscribers in order to keep the subscriber window open. If the subscriber window closes then the subscriber will transition to the slow subscriber state, which is an undesirable behavior from the point of view of a subscribing client that is able to receive messages but has a closed subscriber window because the messaging system was slow in processing acknowledgements. More resources are also required to deliver a message to a slow subscriber than a streaming subscriber so, system performance is improved the more subscribers are in the streaming state. Also once the messaging system has received acknowledgements from all subscribing clients that received a copy of a particular message, that message can be deleted and resources can be recovered. Non-real-time treatment can be given to the tasks of managing space in the transitory low latency storage 205. This includes deleting messages delivered to streaming subscribers or moving messages that are destined for recovering or offline/slow subscribers to a larger backing store 103 which may be external, reachable via storage interface 207. The advantage to separating these processing steps from delivering messages to streaming subscribers and processing of acknowledgements is that separate processing resources can be applied to these tasks and the work can be bundled up in ways that allow it to be completed more efficiently and with more real-time predictability. For example it is more efficient to write to mass storage in large blocks; when moving undeliverable messages to mass storage it is more efficient to bundle multiple messages and write them in a single operation than it is to write each message individually in a series of small operations. Separating the non-real-time processing allows it to be done with maximum efficiency and without affecting the ability of the system to perform its real-time tasks. This promotes ideal system behaviors.

Some systems may favor processing incoming messages from publishers during periods of time when there are insufficient system resources to perform all processing tasks and others may prefer to deliver messages to streaming subscribers and back-pressure publishers. In these cases where system resources are oversubscribed the ideal system behavior will depend on the requirements of the client applications. In these situations it may be desirable to have a configurable client priority to help guide the system in allocating resources to specific tasks. For example the system will allocate more resources to processing messages from high priority publishing clients at the expense of lower priority publishing clients and lower priority streaming subscribing clients. The result is that lower priority publishing clients may experience backpressure and lower priority streaming subscribers may start to accumulate messages and transition to the slow subscriber state. Alternately certain streaming subscribing clients could be configured with high priority. In this case the system will attempt to drain itself of undelivered messages to streaming subscribers by back-pressuring lower priority publishing clients. Continuing to receive new messages at a rate exceeds the rate that the message delivery router can deliver messages to streaming subscribers causes messages to accumulate in the queues for streaming subscribers and the streaming subscribers to transition to the slow subscriber state.

Delivering messages to recovering subscribers has unique requirements. This processing is not latency sensitive or real-time in nature however recovering subscribers desire to transition back to streaming subscribers. From a system point of view it is desirable to get recovering subscribers back to the streaming subscriber behavior because it takes less system resources to deliver a message to a streaming subscriber than to a recovering subscriber since the messages sent to a recovering subscriber typically must be retrieved from mass storage 103 (if not still in low latency storage 205), and the longer a recovering subscriber remains in the recovery state the more newly arriving messages will be added to the backlog. Since sending messages to recovering subscribers is not latency sensitive or real-time in nature attempts should be made to do the work as efficiently as possible in order to get the subscribers caught up and transitioned back to streaming mode as soon as possible. For example it is more efficient to send multiple messages to a recovering subscriber in a single transaction than it is to send the messages individually since latency is not an issue for a recovering subscriber; this is an efficiency that should be taken advantage of in order to conserve system resources that could be applied to other tasks.

Delivering messages to recovering subscribers consumes a lot of system resources. Recovering subscribers seek to receive messages at high rates but, the system must retrieve the messages from disk before they can be delivered; a relatively expensive operation. Depending on the requirements of the applications it may be desirable to have high priority recovering subscribers. The system would allocate a larger portion of the available resources to getting high priority recovering subscribers caught up as quickly as possible at the expense of lower priority recovering subscribers which may not be able to catch up. If there are insufficient resources to available to get all of the recovering subscribers caught up then there is a danger that none of the recovering subscribers will get caught up. Focusing resource allocation on getting the most important client applications caught up promotes better system behaviors.

Slow or offline subscribers should be treated with the lowest priority so that they do not affect other clients. Slow subscribers consume a disproportionate amount of system resources in order to receive a message relative to their streaming counter parts. Similar to the recovering subscriber in order to deliver a message to a slow subscriber the message must first be retrieved from mass storage 103, which is a relatively expensive operation. Delivery of messages to slow subscribers should be treated with non-real-time priority and any opportunities to increase processor efficiency at the expense of latency using any of the previously described bundling techniques should be taken advantage of. All efforts should be made to minimize the impact of slow subscribers on the real-time processing tasks.

The preferred embodiments of the present invention will now be described with reference to FIG. 4, which shows a message delivery system featuring a message delivery router 400, a publishing client 401, a streaming subscriber 402, a recovering subscriber 403 and a slow subscriber 404. It will be understood that the invention equally applies to other messages processing devices such as message brokers. The message delivery router 400 contains a series of work queues 405-412 and two work schedulers (or arbiters) 420, 428. The work schedulers 420, 428 determine which work queues 405-412 to service and allocate system resources. Work scheduler 420 is responsible for scheduling the work items that require real-time processing. Work scheduler 428 is responsible for scheduling non-real-time work items. The work schedulers 420, 428 may use any of the scheduling algorithms known in the art such as strict priority, round robin, weighted round robin, deficit round robin or other. The real-time and non-real-time work schedulers 420 and 428 may use different scheduling algorithms for example algorithms employed by the real-time scheduler 420 are optimized to minimize the latency required to complete a task and algorithms employed by the non-real-time-scheduler 428 are optimized to minimize the utilization of system resources (such as processor cycles) required to complete a task. The ideal behavior of the real-time scheduler is specific to the client applications; in times when the system resources are strained a particular application may prefer the message delivery router to favor one task over another within the real-time scheduler. For example some client applications prefer that publishing clients are never back-pressured even if that causes delivery of messages to streaming subscribers to cease whereas other applications may prefer the message delivery router deliver messages to streaming subscribers even if that means back-pressuring publishing clients. Both of the previously described behaviors of the real-time scheduler can be accommodated within the scope of the present invention by adjusting the parameters of the scheduling algorithm employed by the real-time scheduler. In the ideal implementation the real time work scheduler 420 has dedicated resources assigned to it with which to complete the tasks contained in the work queues 405-408 where these resources are separate from the resources required by the non-real-time scheduler; however all that is required within the scope of the present invention is that the real-time work scheduler 420 has preferential access to system resources.

Another desirable but optional feature of a scheduler implementation is the ability to add additional resources to either the real-time 420 or non-real-time 428 schedulers. By providing the schedulers with additional resources or changing the amount of resources available to each scheduler, system throughput or performance can be improve in many dimensions and possibly optimized to specific application requirements. For example the recent trend in microprocessor technology has been to improve performance by increasing the number of processing cores in the device (rather than increasing the performance of a single core as was the historical method of improving microprocessor performance). A scheduler that can schedule multiple resources in parallel (for example additional threads running on multiple processing cores) would allow system performance to scale up with future improvements to microprocessor technology and would be a desirable feature of a scheduler implementation.

Figure 4:
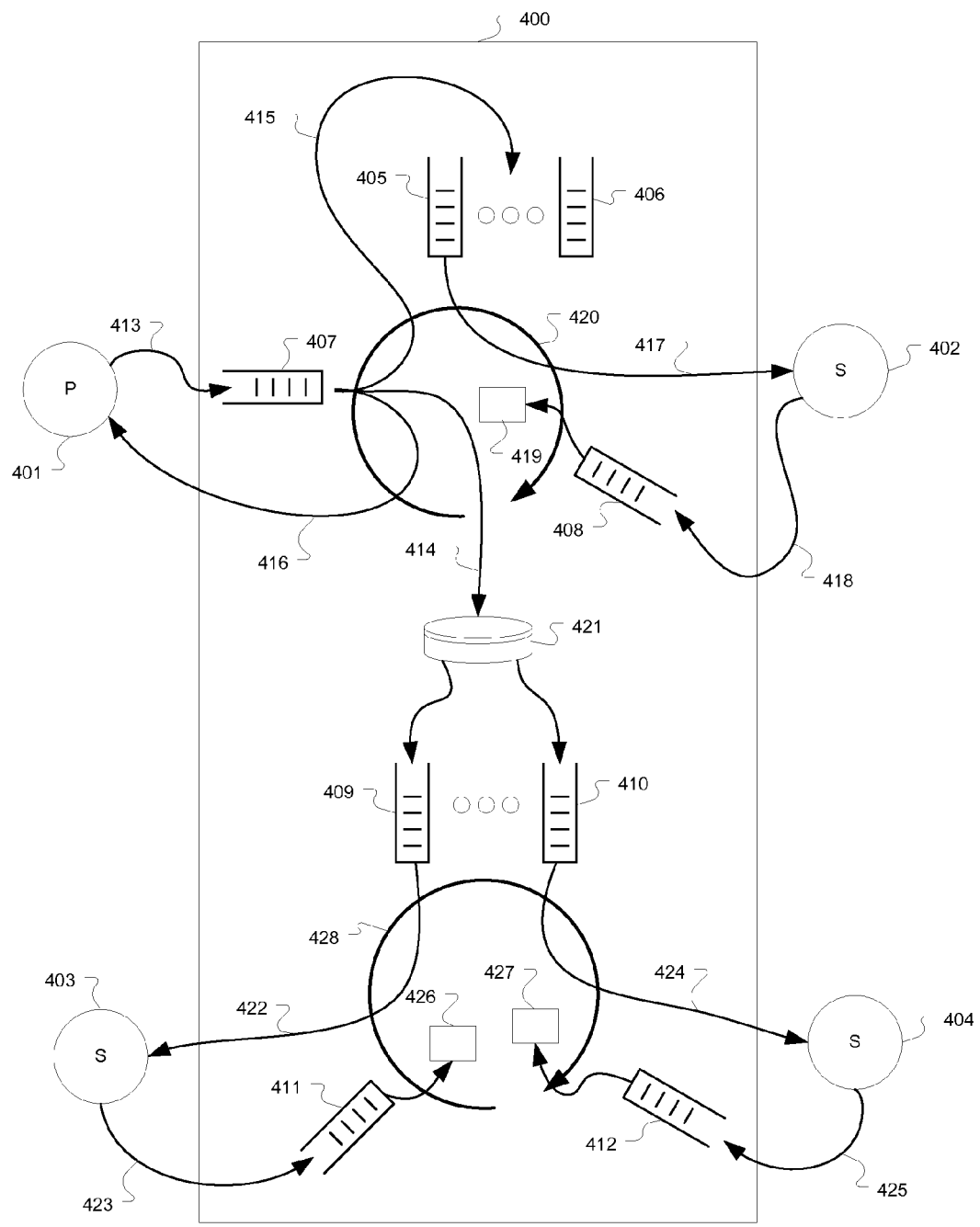
FIG. 4 shows processing tasks performed by an example assured message delivery system.

Publishing client 401 generates and sends messages show as flow 413 in FIG. 4 to the message delivery router 400. The published messages are placed in queue 407 to be serviced by the real-time work scheduler 420. When the real-time work scheduler 420 services the work queue 407 containing the published message a series of tasks are initiated shown as flows 414-416. As previously described there is a series of tasks that must be performed in order by the message delivery router 400 to process a message received by a publishing client 401. The message must be matched to interests of subscribing clients and a copy of the message placed in queue 405-406 to subscribing clients 402-404 for which a matching interest was detected shown as flow 415. Then the message must be placed in non-volatile storage 421 shown as flow 414 and finally an acknowledgement of receipt can be sent to the publisher 401 shown as flow 416.

Messages placed in queue 405-406 to streaming subscriber(s) 402 are also processed by the real-time scheduler 420. As previously described streaming subscriber(s) 402 should by definition not have messages in queue 405-406 in excess of their current window size. Since the streaming subscriber by definition is ready and able to receive messages when the real-time scheduler 420 services the work queue 405-406 containing a work item to send a copy of the message to a streaming subscriber 402 (shown as flow 417) the message can be retrieved from system RAM (where a copy has been cached) as opposed to non-volatile storage 421. Not having to retrieve the message from disk (or other non-volatile storage) in order to deliver a copy to the streaming subscriber(s) 402 allows this task to be performed with minimal latency and maximum efficiency as per the previously described ideal message delivery router 400 behavior. Once the streaming subscriber 402 has received a copy of the message from the message delivery router 400 it will return an acknowledgement of receipt shown as flow 418. The subscriber acknowledgement(s) are placed in work queue 408 to be serviced by the real-time work scheduler 420. As previously described when the message delivery router delivers messages to a subscriber, the size of the subscriber's window decreases and when the subscriber returns an acknowledgement the window size increases (or opens up). If a subscriber's window decreases to zero (or closes) then the subscriber will transition to the slow subscriber behavior and the subscriber's work queue will be serviced by the non-real-time work scheduler 428. When the real-time work scheduler 420 services streaming subscriber acknowledgement queue 408 the work item is forwarded to subscriber acknowledgement processor 419. The subscriber acknowledgement processor 419 maintains the receive windows for streaming subscribing client(s) 402 and maintains delivery status of messages.

The non-real-time work scheduler 428 services work queues 409-410 that contain messages bound for recovering subscriber(s) 403 and slow subscribers 404; it also services work queues 411-412 containing subscriber acknowledgements from recovering 403 and slow subscribers 404. The non-real-time work scheduler 428 may also service additional work queues, not shown in FIG. 4, containing housekeeping tasks. For example if the message delivery router is implemented using the techniques described by Buchko there is a requirement to free up space in the low latency transitory non-volatile storage 205 by moving messages that are destined for offline or slow subscribers to a larger non-volatile storage 103, such as disk-based storage. The non-real-time scheduler 428 endeavors to service its work queues 409-412 as efficiently as possible. The tasks performed by the non-real-time scheduler 428 are not latency sensitive and should be scheduled in such a way as to make the most efficient use of system resources. This may include bundling the processing of multiple events where they can be processed more efficiently as a group than individually.

The subscriber message queues 409-410 serviced by the non-real-time scheduler 428 are differentiated from those serviced by the real-time scheduler 420 because the messages that are delivered by the non-real-time scheduler 428 must be retrieved from non-volatile storage 421 before they can be delivered. Retrieving a message from non-volatile storage 421 is a much more compute intensive operation than retrieving a copy of the message that is cached in system RAM 203 as is the common case for messages delivered by the real-time work scheduler 420. Note that all assured messaging systems must place a copy of any messages received in non-volatile storage 421 in case of system failure however it is common for message delivery systems to retain a cached copy of messages in RAM 203 so that they can be delivered to subscribing clients with reduced latency. System RAM 203 is expensive storage (relative to disk in terms of cost per bit) and message delivery systems are generally constrained by the amount of RAM 203 they have available; messages that must remain in the system for a relatively long time before delivery are typically evicted from the RAM cache 203 and must be retrieved from disk based storage 103 prior to delivery to recovering or slow subscribers 403, 404 by the non-real-time scheduler 428.

The non-real-time scheduler 428 should give some preference to servicing events from recovering subscriber queue(s) 409. Recovering subscribers 403 endeavor to reduce the number of messages queued for them by the message delivery router 400 to zero so that they can transition to the streaming subscriber behavior. In order to facilitate this, the non-real-time scheduler 428 may choose to retrieve a whole window worth of messages from non-volatile storage 421 before delivery to recovering subscriber(s) 403 via work queue 409. Subscriber acknowledgements received from recovering subscriber(s) 403 shown as flow 423 are placed in work queue 411 to be serviced by the non-real-time scheduler 428. Subscriber acknowledgements from recovering subscriber(s) 403 are processed by subscriber acknowledgement processor 426, the reception of a subscriber acknowledgement will open the subscriber's window allowing the message delivery router 400 to deliver more messages to the subscriber 403. Processing acknowledgements in queue 411 from recovering subscriber(s) 403 should be given preference by the non-real-time scheduler 428 over servicing work items from work queues 410, 412 associated with offline or slow subscribers.

Offline or slow subscriber(s) 404 are similar to the recovering subscriber(s) 403 because messages to be delivered to them typically must be retrieved from non-volatile storage 421 prior to delivery but differ in that the rate that messages are arriving at their queue 410 is greater than the rate at which the subscriber 404 is able to receive messages at. Recovering subscriber(s) 403 are able to receive messages at a rate that is higher than the rate at which they are arriving. Servicing work queues 410, 412 associated with offline or slow subscriber(s) 404 is lower priority work for the non-real-time scheduler 428. The processing associated with slow subscriber(s) 404 is similar to that of recovering subscriber 403; it is simply scheduled with lower priority by the non-real-time scheduler 428. The non-real-time scheduler 428 services work queue 410 containing messages destined for slow subscriber(s) 404; the messages typically must be retrieved from non-volatile storage 421 prior to delivery. Delivery of the messages is shown as flow 424. Once the slow subscribing client 404 has received a message it will return an acknowledgement of receipt shown as flow 425. The acknowledgements from the slow subscriber(s) 404 are placed in work queue 412 to be serviced by the non-real-time work scheduler 428 with lowest priority. The acknowledgements will be processed by the subscriber acknowledgement processor 427 that will make the appropriate adjustments to the subscriber(s) 404 window.

Those skilled in the art will see that within the scope of the present invention there could be additional work queues (in addition to work queues 407-412) containing additional work items to be scheduled by the real-time scheduler 420 or non-real-time scheduler 428. For example additional protocol messages as in the previously described multi-way handshake could be placed in separate work queues (not shown in FIG. 4) and scheduled by the real-time 420 and non-real-time 428 work schedulers with a unique level of preference; completion events of asynchronous read or write requests from non-volatile storage 421 could be placed in their own queue for servicing. Those skilled in the art will also see that within the scope of the present invention that there are many possible implementations of work schedulers 420, 428 to optimize certain behaviors or to prevent some unwanted behaviors. For example if the non-real-time work scheduler 428 is implemented as a strict priority scheduler; under certain traffic patterns a strict priority scheduler could cause delivery to slow subscribers to cease by a mechanism known as starvation. It is possible that the non-real-time scheduler 428 could be implemented using an alternate scheduling algorithm that prevents the phenomenon of starvation; such algorithms are known in the art, an example of one is weighted fair queuing; alternatively the scheduler could dynamically adjust to providing better service to particular clients. For example the non-real-time scheduler may allocate a larger portion of its resources to the "fastest" recovering subscribers, or those with the smallest queue to allow them to become streaming faster, or based on a user-configured "recovery priority" to allow more important applications to be recovered in preference to lower priority applications when contending for system resources. Those skilled in the art will see that there are many possible optimizations of the scheduling algorithms depending on the requirements of the client applications and the implementation of other system components and functions.

Prior art message delivery systems do not distinguish between real-time and non-real-time processing tasks and so the presence of recovering subscribers or slow or offline subscribers will negatively affect the ability of the system to provide real-time service levels to publishing clients and streaming subscribers. In order to provide a system that provides the ideal system behavior under a wide range of load conditions the present invention identifies types of system clients and separates their associated processing tasks. Once separated the processing tasks can be prioritized such that the non-real-time tasks do not affect the real-time tasks; furthermore dedicated resources can be applied to the different tasks such that they can be performed with maximum efficiency and with separate, isolated and predictable performance. The following tasks should be treated with real-time priority: receiving messages from publishing clients, storing the messages in non-volatile storage and returning acknowledgements, delivering messages to streaming subscribers and processing acknowledgements from streaming subscribers.

The following tasks should be treated with non-real-time priority: delivery of messages to recovering subscribers, housekeeping tasks such as moving undeliverable messages (undeliverable because they are destined for slow, offline or recovering subscribers) to mass storage and delivery of messages to slow subscribers. Those skilled in the art will see that there are other possible ways to assign the priority with which processing tasks are treated in order to optimize other system behaviors.

It will be appreciated by persons skilled in the art that many variants of the invention are possible.

All references mentioned above are herein incorporated by reference.

We claim:

1. A computer-implemented method of managing shared resources for controlling message flows in an assured message delivery system having a plurality of clients, comprising:

identifying different classes of clients based on their performance behaviors; and providing differentiated access to said shared resources between said different classes of clients, wherein the following tasks are processed with real-time priority: receiving messages from publishing clients, placing messages in non-volatile storage and returning acknowledgements thereto, and delivering of messages to streaming subscribers and, processing acknowledgements from streaming subscribers; and the following tasks are processed with non real-time priority: delivery messages to recovering subscribers; and delivery of messages to slow subscribers.

* * * * *